United States Patent [19]

Krause

[11] 3,898,208

[45] Aug. 5, 1975

[54] HYDROGENATION OF OIL-INSOLUBLE DIENE POLYMERS

[75] Inventor: Reuben L. Krause, Angleton, Tex.

[73] Assignee: The Dow Chemical Company, Midland, Mich.

[22] Filed: June 29, 1973

[21] Appl. No.: 374,853

Related U.S. Application Data

[63] Continuation-in-part of Ser. No. 155,344, June 21, 1971.

[52] U.S. Cl........ 260/85.1; 260/94.7 H; 260/96 HY
[51] Int. Cl.............................................. C08d 5/02
[58] Field of Search.......... 260/94.7 H, 96 HY, 85.1

[56] References Cited
UNITED STATES PATENTS

| | | | |
|---|---|---|---|
| 2,743,233 | 4/1956 | Fisher | 260/94.7 H |
| 3,454,644 | 7/1969 | Dewhirst | 260/96 HY X |

*Primary Examiner*—William F. Hamrock
*Attorney, Agent, or Firm*—Richard G. Waterman; Michael J. Jenkins

[57] ABSTRACT

Latexes of oil-insoluble monovinylidene aromatic/conjugated diene copolymers having residual unsaturation are hydrogenated by supplying hydrogen to a dispersion of the latex in a swelling agent for the copolymer which dispersion contains a homogeneous hydrogenation catalyst such as tris(triphenyl)chlororhodium

11 Claims, No Drawings

HYDROGENATION OF OIL-INSOLUBLE DIENE POLYMERS

CROSS-REFERENCE TO RELATED APPLICATION

The present application is a continuation-in-part of my previous application Ser. No. 155,344 filed June 21, 1971.

BACKGROUND OF THE INVENTION

This invention relates to latexes of oil-insoluble monovinylidene aromatic/aliphatic conjugated diene copolymers having significantly reduced residual unsaturation and method for preparation thereof.

Latexes of monovinylidene aromatic/aliphatic conjugated diene copolymers are known to be useful in the manufacture of foam rubber, paper coatings, paints and the like. Particularly desirable latexes of such polymers are prepared by emulsion polymerization conditions of relatively high temperature and the like to promote high conversion of monomer to polymer. The resulting copolymer particles produced by these so-called high conversion techniques are generally oil-insoluble as a result of partial cross-linking of the copolymer molecules. Conditions for preparing such oil-insoluble copolymer latexes are well known, e.g., see U.S. Pat. No. 2,460,300.

As is the case with latexes of oil-soluble copolymers of aliphatic conjugated dienes, the oil-insoluble copolymer latexes described hereinbefore contain substantial residual unsaturation. The presence of such residual unsaturation renders films, coatings and other articles prepared from such latexes susceptible to degradation upon exposure to light.

In the case of the oil-soluble polymer, the residual unsaturation can be substantially reduced by conventional hydrogenation in a solution of the polymer using well-known techniques, e.g., U.S. Pat. Nos. 2,046,257, 2,046,260, and 45 Ind. Eng. Chem. pgs. 1117–22(1953).

Unfortunately, oil-insoluble polymers of conjugated dienes, particularly latexes of oil-insoluble monovinylidene aromatic/conjugated diene copolymer, e.g., styrene/butadiene copolymer, which contain a measurable degree of residual unsaturation, can not be effectively hydrogenated using techniques of the prior art. Therefore it would be highly desirable to provide a process for effectively hydrogenating essentially all residual unsaturation of oil-insoluble polymers of conjugated dienes.

SUMMARY OF THE INVENTION

In accordance with present invention, oil-insoluble polymers of conjugated dienes containing residual unsaturation are effectively hydrogenated by a process which comprises reacting the oil-insoluble polymer dispersed in a swelling agent therefor with hydrogen in the presence of a catalytic amount of a homogeneous hydrogenation coordination complex catalyst represented by the formula:

$$M(X)_a(Y)_b(Z)_c$$

wherein M is rhodium, X is an anion, Y is a ligand capable of donating an unshared pair of electrons to the coordination sphere of M; Z is a ligand capable of complexing with halide ion; $a$ is a positive integer which is at least equivalent to the valence number of M and not greater than the coordination number of M; $b$ is a positive integer not greater than the coordination number of M; and $c$ is 0 or a positive integer not greater than the total number of halide ions in the complex, with the further proviso that the sum of $a$ and $b$ is at least equivalent to the coordination number of M and not greater than the sum of the valence number of M and the coordination number of M.

The resulting hydrogenated polymers exhibit increased resistance to light and aging which normally tend to harden and discolor the polymers. Such polymers have wider applicability, for example, in coatings and moldings for outdoor use.

DETAILED DESCRIPTION OF THE PREFERRED EMBODIMENTS

In the present invention, an oil-insoluble polymer of conjugated diene includes polymers of butadiene, isoprene, 2,3-dimethyl-1,3-butadiene; methylpentadiene; 3,4-dimethyl-1,3-hexadiene; 4,5-dimethyl-1,3-octadiene and other conjugated diethylenically unsaturated hydrocarbon monomers, preferably such oil-insoluble polymers are copolymers of the conjugated diene with emulsion-polymerizable ethylenically unsaturated compounds such as the monovinylidene aromatic compounds, α, β-ethylenically unsaturated carboxylic acids, the derivatives of α, β-ethylenically unsaturated carboxylic acids such as the alkyl acrylates and methacrylates, acrylic nitriles; maleic esters, fumaric esters, vinyl esters of saturated carboxylic acids and unsaturated ketones. Most preferred among the foregoing monomers which are copolymerizable with the conjugated dienes are the monovinylidene carbocyclic aromatic compounds such as styrene, α-methylstyrene, ar-methylstyrene, ar-ethylstrene, α-ar-dimethylstyrene, ar,ar-dimethylstyrene, ar-t-butyl styrene, vinyl naphthalene, methoxystyrene, cyanostyrene, acetylstyrene, monochlorosytrene, dichlorostyrene monobromostyrene, dibromostyrene and other halostyrenes, α, β-ethylenically unsaturated carboxylic acids having from 3 to 8 carbon atoms such as acrylic acid, methacrylic acid, itaconic acid, fumaric acid, maleic acid and anhydride, citraconic acid and anhydride and aconitic acid; alkyl esters of α, β-ethylenically unsaturated carboxylic acids wherein alkyl moiety has from 1 to 15 carbon atoms and acid moiety has from 3 to 8 carbon atoms such as methyl acrylate, ethyl acrylate, methyl methacrylate, propyl acrylate, isobutyl acrylate, butyl acrylate, hexyl acrylate, 2-ethylhexyl acrylate, lauryl methacrylate, phenyl acrylate, β-hydroxyethyl acrylate, 2-hydroxyethyl methacrylate, ethyl α-chloroacrylate, and diethyl maleate; vinyl esters of non-polymerizable carboxylic acids having from 2 to 10 carbon atoms such as vinyl acetate, vinyl propionate, vinyl butyrate and vinyl benzoate; ethylenically unsaturated amides and nitriles having from 3 to 8 carbon atoms such as acrylonitrile, methacrylonitrile, fumaronitrile, ethacrylonitrile, acrylamide, fumaramide, and methacrylamide; and monoethylenically unsaturated ethers and ketones having from 3 to 12 carbon atoms such as vinyl methyl ketone, methyl isopropenyl ketone, vinyl ethyl ether. It should be recognized that the above is not an all-inclusive list but is representative of known monomers which may be copolymerized with the diethylenically unsaturated hydrocarbon monomers described above. The monomer compositions of choice for the practice of this invention contain at least about 15 weight percent of such diethylenically unsaturated hydrocarbon monomers. Especially preferred copolymers contain from about 30 to about 40 weight percent of polymerized conjugated diene, from about 70 to about 50 weight percent of polymerized monovinylidene carbocylic aromatic compound and from 0 to about 10 weight percent of one or more other monomer set forth hereinbefore.

The foregoing polymers, generally in the form of latexes, i.e., colloidal aqueous dispersions of said polymer particles, are most advantageously prepared by the process described in U.S. Pat. No. 3,563,946 which is incorporated by reference in its entirety. More generally, the polymers are prepared by conventional emulsion polymerization processes in which temperatures of greater than about 50°C are employed, so-called "hot processes," e.g., as shown in U.S. Pat. No. 2,460,300.

In accordance with such prior art processes, latex of polymers which are generally insoluble in oil are produced. Such oil-insolubility is believed to be caused by partial cross-linking which occurs as a result of polymerizing the monomeric material at the temperatures characteristic of such hot processes. It is understood, however, that this invention is not limited to polymers prepared by a particular process, but to polymers containing conjugated diene which are oil-insoluble. By "oil-insoluble polymer" is meant a polymer which will not form a physically homogeneous mixture with organic materials, i.e., organic solvents and other materials conventionally classified as oils.

The polymers hydrogenated in the practice of this invention are further characterized as having a residual unsaturation of from about 5 to about 48 weight percent

based on total weight of dry polymer, preferably from about 6.5 to about 17.5 weight percent.

Suitable swelling agents for the polymers are those materials which permeate into the polymer thereby causing the volume of the polymer to increase. Examples of suitable swelling agents include aliphatic hydrocarbons such as hexane, octane, iso-octane, cyclopentane, cyclohexane and the like; aromatic hydrocarbons such as benzene, toluene, xylene, ethylbenzene, diethylbenzene and the like; halogenated aromatic compounds such as chlorobenzene, chlorotoluene and the like; aliphatic ethers such as dimethoxyethane, dioxane, diethyl ether and the like; halogenated aliphatic alkanes such as methylene chloride and ethylene dichloride and the like; and mixtures of the aforementioned swelling agents. It is further required that the suitable swelling agents be solvents for the hydrogenation catalyst.

The hydrogenation catalyst suitable for use in this invention is a homogeneous hydrogenation coordination complex, preferably represented by the formula:

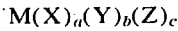

M is rhodium. X is an anion such as halide ion, e.g., chloride, bromide, iodide and fluoride; cyanide ion; thiocyanate ion; and hydride ion; preferably chloride. Y is a neutral ligand having an unshared pair of electrons such as carbonyl, trialkyl phosphine wherein alkyl has from 1 to 14 carbon atoms, triaryl phosphine wherein aryl has from 6 to 14 carbon atoms, mixed alkyl and aryl phosphines, corresponding arsines and stibenes of the foregoing phosphines, pyridines and substituted pyridines and molecules of organic solvent for the complex which molecules have an unshared pair of electrons and which do not deleteriously affect the catalytic properties of the complexes, preferably Y is triphenylphosphine. Z is a ligand capable of complexing with halide ion such as stannous chloride. The letter $a$ represents a positive integer which is at least equivalent to the valence number of M and not greater than the coordination number of M; preferably $a$ is equivalent to the valence of M which is preferably 1 or 2, especially 1. The letter $b$ is a positive integer not greater than the coordination number of M; preferably $b$ is 1, 2, 3, or 4, especially 2 or 3. The letter $c$ is zero or a positive integer not greater than the number of halide ions in the complex; preferably $c$ is 0 or 1. It is also provided that the sum of $a$ and $b$ is positive integer which is at least equivalent to the coordination number of M and not greater than the sum of the valence number and the coordination number of M, preferably the sum of $a$ and $b$ is 4, 5, or 6, especially 4.

Solvents suitably present in the complex are aliphatic ethers such as diethyl ether, tetrahydrofuran, dioxane, dimethoxyethane and the like; aromatic hydrocarbons such as benzene, toluene, xylene, ethyl benzene and the like; aliphatic alcohols such as ethanol, n-propanol, isopropanol, n-butanol, octanol and the like; and other common organic solvents having unshared pairs of electrons which do not destroy the catalytic activity of the complex.

A particularly effective catalyst is halo tris (triphenylphosphine)rhodium(I) such as chlorotris(triphenylphosphine)rhodium(I) with corresponding bromides and iodides being suitable. Also suitable are such complexes as chlorotris(triphenylarsine)rhodium(I), chlorotris(pyridine)rhodium(I), chlorotris(triethylphosphine)rhodium(I), chlorotris(ethyldiphenylphosphine)rhodium(I), chlorotris-(tributylphosphine)rhodium(I), chlorobis(triphenylphosphine)-(tributylphosphine)rhodium(I), chlorobis(triphenylarsine)-(triethylphosphine)rhodium(I), chlorocarbonylbis(triphenylphosphine)rhodium(I), trichlorotris(triphenylphosphine)-rhodium(III), chlorotris(dimethylphenylphosphine)rhodium(I) hydrocarbonylbis(triphenylphosphine)rhodium(I), thiocyantotris(triethylstibene)rhodium(I) and the like. Methods for preparing the foregoing catalysts are well known, for example, as is shown by Osborn et al in J. Chem. Soc. (A), pp. 1711–32 (1966) which is incorporated herein by reference.

In the practice of this invention, hydrogenation is effectively carried out in the presence of a catalytic amount of the catalyst described hereinbefore at temperatures in the range of from about 15° to about 100°C, preferably from about 20° to about 50°C, under pressures of hydrogen in the range of from about 15 to about 2000 psi. Concentrations of catalyst which are particularly effective in practice of this invention range from about 0.1 to about 15 weight parts per 100 weight parts of polymer.

According to this invention, the concentration of polymer to be hydrogenated in dispersion of dry polymer in the swelling agent may be varied from about 0.1 to about 10 weight percent based on total dispersion, preferably from about 4 to about 6 weight percent.

It is to be understood, however, that one unique advantage of this invention is that a latex of the oil-insoluble polymer dispersed in the swelling agent can be subjected to hydrogenation conditions of this invention and substantial hydrogenation of residual unsaturation is accomplished. In such embodiments, it is desirable to employ concentrations of polymer to swelling agent in weight ratios of 1:100 to 4:1, temperatures in the range of from about 60° to about 90°C, pressure of hydrogen in the range of from about 500 to about 800 psi and catalyst concentration in the range of from about 0.5 to about 2 weight parts per 100 weight parts of polymer.

Alternatively, the latex can be coagulated prior to hydrogenation and the collected polymer solids can be dispersed in the swelling agent. The resulting dispersion is then subjected to hydrogenation conditions as specified hereinbefore.

Although agitation rate is not particularly critical, it is generally desirable to agitate the reaction mixture during hydrogenation in order to increase the rate of solution of hydrogen in the reaction mixture. It is understood, however, that the hydrogenation can be suitably effected in the absence of agitation.

After hydrogenation, removal of swelling agent and catalysts from the hydrogenated polymer, if desired, is easily carried out by adding alcohol such as ethanol to the reaction mixture to cause coagulation of the hydrogenated polymer which can then be filtered, and washed free of impurities. Removal of swelling agent can also be effected by volatilization without coagulating the latex.

In instances wherein the polymer is coagulated from latex form prior to hydrogenation, coagulation is accomplished by known techniques for coagulating anionically stabilized latexes, e.g., by lowering pH of the latex, by freezing and thawing the latex, and by adding of destabilizing electrolytes. Following hydrogenation of the coagulated material, the hydrogenated polymer is preferably reemulsified by (1) dispersing the coagulated polymer in liquid swelling agent to provide a dispersion having from about 1 to about 3 weight percent polymer based on total dispersion, (2) emulsifying the dispersion in water or an aqueous solution of emulsifier by homogenizing the aqueous and oil phases and (3) subsequently removing volatile swelling agent and excess water to form a 20 to 25 weight percent polymer solids latex. In the emulsification step, it is generally desirable to employ from about 4 to about 5 weight parts of water or aqueous medium for each part of the dispersion of polymer in swelling agent.

According to the present invention, there can be produced latexes of oil-insoluble polymers having very low residual unsaturation, e.g., from about 2 to about 34 weight percent of

based on

present before hydrogenation preferably from about 2 to about 11. Such polymers having such low residual unsaturation are novel and exhibit unexpected properties of improved resistance to heat and ultraviolet light.

The following examples are given to illustrate the invention and should not be construed as limiting its scope. In the following examples, all parts and percentages are by weight unless otherwise indicated.

EXAMPLE 1

To a stainless steel rocking autoclave are charged 0.05 g of chlorotris(triphenylphosphine)rhodium(I) and 30 g of a 1.65 percent dispersion of oil-insoluble styrene-butadiene (67/33) copolymer in benzene. The rhodium catalyst is prepared by stirring 2 grams of rhodium trichloride and 12 grams of triphenylphosphine in 95 percent ethanol for 1.5 hour at 75°C. The resulting catalyst is filtered and dried.

The styrene/butadiene copolymer is prepared in latex form by the process of Example 1 of U.S. Pat. No. 3,563,946 and coagulated by removal of water. The autoclave containing the reaction mixture is purged with nitrogen and pressured to 590 psi with hydrogen. The autoclave is rocked at 590 psi for 3 hours at 5°C and at 600 psi for 18 hours at 22°C. The autoclave is then cooled to room temperature, depressurized and the hydrogenated product is analyzed for residual unsaturation using an infrared spectrometer. The results of this analysis are recorded in Table I.

In a similar manner five additional hydrogenation runs (Run Nos. 2–6) are carried out using different reaction conditions as set forth in Table I. The hydrogenated products of these runs are also analyzed for residual unsaturation.

TABLE I

| | Catalyst | | Copolymer Dispersion(1) | | Reaction Conditions | | | Residual Unsaturation, % (2) |
|---|---|---|---|---|---|---|---|---|
| Run No. | Type | Amount, Grams | Amount, Grams | Copolymer Concentration, % | Temp., °C | Time, Hrs. | $H_2$ Pressure (psi) | |
| 1 | RhCl[Ph$_3$] | 0.05 | 30 | 1.65 | 5 | 3 | 590 | 15.0 (no hydrogenation) |
| 2 | RhCl[Ph$_3$] | 0.02 | 30 | 6.7 | 22 | 18 | 600 | 0.3 |
| 3 | RhCl[Ph$_3$] | 0.02 | 30 | 2.2 | 30 | 18 | 700 | 5.7 |
| 4 | RhCl[Ph$_3$] | 0.05 | 30 | 3.5 | 32 | 22 | 800 | 5.1 |
| 5 | RhCl[Ph$_3$] | 0.20 | 80 | 8.0 | 36 | 16 | 550 | 0.6 |
| | | | | | 30 | 3 | 600 | 5.7 |
| 6 | RhCl[Ph$_3$] | 0.20 | 150 | 6.0 | 65 | 3 | 440 | 2.3 |
| | | | | | 31 | 36 | 800 | 1.7 |

(1) Styrene/butadiene (67/33) copolymer having residual unsaturation of 15 percent.
(2) Expressed as weight percent of —CH=CH— in dried, solvent-free copolymer.

EXAMPLE 2

The hydrogenated products of Example 1 are reemulsified to latex form by dispersing the hydrogenated copolymer in benzene to a 2 percent copolymer dispersion. Twenty parts of this dispersion is mixed with 80 parts of distilled water and homogenized using a small laboratory homogenizer. The resulting homogenized emulsion is charged to a rotary evaporator, and volatiles are removed under vacuum to form a 20–25 percent solids latex having average particle sizes varying from 0.40 to 0.50 micron. The original latex prior to hydrogenation in accordance with Example 1 has average particle size of 0.25 micron.

EXAMPLE 3

To a 112 ml stainless steel rocking autoclave are charged 0.10 g of chlorotris(triphenylphosphine)rhodium, 24 g of a 55 percent solids latex of styrene/-butadiene (67/33) copolymer having residual unsaturation of 15 percent and 7 g of benzene.

The autoclave containing the foregoing reaction mixture is purged with nitrogen and pressured to 740 psi. with hydrogen. The autoclave is rocked at 740 psi. for 15 hours at 79°C. The autoclave is then cooled to room temperature, depressurized, and the hydrogenated product is analyzed for residual unsaturation using an infrared spectrometer. The results of this analysis are recorded in Table II.

In a similar manner several additional hydrogenation runs are carried out using different reaction conditions as set forth in Table II. In Run No. 4, no swelling agent is employed; therefore Run No. 4 is not an example of this invention. The hydrogenated products of these runs are similarly analyzed for residual unsaturation and the results are recorded in Table II.

For the purposes of comparison, several runs (Run Nos. $A_1$–$A_3$) are carried out in the same manner as in the previous runs using different hydrogenation catalysts not within the scope of this invention. The results of these runs are also recorded in Table II.

EXAMPLE 4

Several hydrogenated latexes of the previous examples are applied as films onto glass and porcelain substrates. The films are dried at 23°C for a period of 24 hours. A portion of each film is tested for thermal stability by heating the portion at 100°C for a period of days. Another portion of each film is tested for ultra violet light stability by exposing the portion to ultra violet light for a period of days. The results of these tests are recorded in Table III.

For the purpose of comparison, a control run (Run No. $C_1$) is carried out in a manner similar to those of the preceding paragraph except that the latex is not hydrogenated. The results of this control run are also recorded in Table III.

TABLE III

| Run No. | Residual Unsaturation(1), % | Film Thickness | Thermal Stability(2) Hardening, No. of days | Thermal Stability(2) Coloring, No. of days | UV Light Stability(3) Hardening, No. of days |
| --- | --- | --- | --- | --- | --- |
| 1 | 0.3 | 0.5 mm | 75 (unchanged) | No Determination | 75 (unchanged) |
| 2 | 0.6 | 0.5 mm | 50 (unchanged) | 53 (unchanged) | 50 (unchanged) |
| 3 | 1.7 | 0.5 mm | 30 (unchanged) | 31 (unchanged) | No Determination |
| 4 | 5.1 | 0.5 mm | 35 (hardened) | No Determination | 36 (hardened) |
| $C_1$* | 15 | 0.5 mm | 6 (hardened) | 5 (orange) | 16 (hardened) |

*Not an example of invention
(1)Same as (2) in Table I
(2)Number of days the copolymer film remains in contact with air at 100°C. The hardening and coloring of the film are observed.
(3)Number of days of exposure to a 100 watt mercury vapor lamp and the hardening of the film is observed.

What is claimed is:

1. A process for hydrogenating oil-insoluble polymers of conjugated dienes containing residual unsaturation which comprises reacting the oil-insoluble polymer dispersed in a swelling agent therefor with hydrogen in the presence of a catalytic amount of a homogeneous hydrogenation coordination complex represented by the formula:

$$M(X)_a(Y)_b(Z)_c$$

wherein M is rhodium, X is an anion, Y is a ligand capable of donating an unshared pair of electrons to the coordination sphere of M, Z is a ligand capable of complexing with halide ion, $a$ is a positive integer which is at least equivalent to the valence number of M and not greater than the coordination number of M, $b$ is a positive integer not greater than the coordination number of M, and $c$ is 0 or a positive member not greater than the total number of halide ions in the complex, with the further proviso that the sum of $a$ and $b$ is not greater than the sum of the valence number of M and the coordination number of M, said swelling agent being a sol-

TABLE II

| Run No. | Catalyst Type | Catalyst Amount, Grams | Copolymer Latex Charge, Grams | Copolymer Latex % Solids | Swelling Agent Type | Swelling Agent Amount, Grams | Reaction Conditions Temp., °C | Reaction Conditions Time, hr | Reaction Conditions $H_2$ Pressure, (psi) | Residual Unsaturation % (1) |
| --- | --- | --- | --- | --- | --- | --- | --- | --- | --- | --- |
| 1 | RhCl[Ph₃] | 0.10 | 24 | 55 | Benzene | 7 | 79 | 15 | 740 | 8.7 |
| 2 | RhCl[Ph₃] | 0.10 | 28 | 27.5 | Benzene | 7 | 92 | 17 | 800 | 8.4 |
| 3 | RhCl[Ph₃] | 0.05 | 28 | 27.5 | Benzene | 7 | 77 | 11 | 700 | 6.9 |
| 4* | RhCl[Ph₃] | 0.05 | 30 | 27.5 | None | 0 | 79 | 17 | 650 | 15.0 (no hydrogenation) |
| 5 | RhCl[Ph₃] | 0.10 | 28 | 40 | Toluene | 7 | 77 | 22 | 600 | 9.9 |
| $A_1$* | Nickel acetyl acetonate | 0.5 | 28 | 27.5 | Benzene | 7 | 87 | 20 | 600 | 15.0 (no hydrogenation) |
| $A_2$* | Nickel acetyl acetonate | 0.5 | 28 | 27.5 | Benzene | 7 | 130 | 2½ | 800 | 15.0 (no hydrogenation) |
| $A_3$* | NiCl₂+NaBH₄+ Ph₂PCH₂CH₂PPH₂ | (0.037+0.10 +0.062) | 25 | 55 | Benzene | 8.5 | 33 | 20 | 700 | 15.0 (no hydrogenation) |

*Not an example of the invention
(1)Same as (2) in Table 1 vent for the coordination complex, thereby effectively hydrogenating the residual unsaturation of the polymer.

2. The process according to claim 1 wherein X is selected from the group consisting of halide ion, cyanide ion, thiocyanate ion and hydride ion; Y is selected from the group consisting of carbonyl, trialkylphosphine wherein alkyl has from 1 to 14 carbon atoms, triarylphosphine wherein aryl has from 6 to 14 carbon atoms, mixed alkyl and aryl phosphines, trialkyl arsines and trialkyl stibenes wherein alkyl has from 1 to 14 carbon atoms, triaryl arsines and triaryl stibenes wherein aryl has from 6 to 14 carbon atoms, mixed alkyl and aryl arsines and stibenes, pyridines and substituted pyridines, molecules of organic material which is a solvent for the complex which molecules have an unshared pair of electrons and do not deleteriously affect the catalytic properties of the complex; and Z is stannous chloride.

3. The process according to claim 2 wherein the swelling agent is selected from the group consisting of aliphatic hydrocarbons, aromatic hydrocarbons, halogenated aliphatic and aromatic hydrocarbons and aliphatic ethers which swelling agent is a solvent for the complex.

4. The process according to claim 3 wherein the polymer is a copolymer of styrene and butadiene having a residual unsaturation of from about 6.5 to about 17.5 weight percent of

based on the total weight of dry copolymer.

5. The process according to claim 4 wherein the concentration of copolymer in the dispersion of copolymer in swelling agent is in the range of from about 0.1 to about 10 weight percent based on the total dispersion.

6. The process according to claim 5 wherein the catalytic amount of complex is in the range of from about 0.1 to about 15 weight parts of complex per 100 weight parts of copolymer.

7. The process according to claim 5 wherein reaction of the copolymer with hydrogen is effected under pressures of hydrogen in the range of from about 15 to about 2,000 psi and temperatures in the range of from about 15° to about 100°C.

8. The process according to claim 7 wherein the complex is chlorotris(triphenylphosphine)rhodium(I).

9. The process according to claim 8 wherein the swelling agent is benzene.

10. The process according to claim 1 wherein the complex is selected from the group consisting of chlorotris(triphenylphosphine)rhodium(I), chlorocarbonylbis-(triphenylphosphine)rhodium(I), and hydrocarbonylbis-(triphenylphosphine)rhodium(I).

11. The process according to claim 1 wherein X is chloride, or hydride ion, Y is trialkyl phosphine having from 1 to 14 carbon atoms, triaryl phosphine having from 6 to 14 carbon atoms, triaryl phosphine having from 6 to 14 carbon atoms, mixed alkyl and aryl phosphine or carbonyl and c is zero.

* * * * *